_(12)_ United States Patent
Armanino et al.

(10) Patent No.: US 7,577,245 B2
(45) Date of Patent: Aug. 18, 2009

(54) METHOD OF DETECTING MISROUTED INTER-OFFICE TRANSPORT FACILITY ROUTES IN A TELECOMMUNICATIONS SYSTEM

(75) Inventors: Frederick Michael Armanino, San Antonio, TX (US); Tomoko O. Convis, Danville, CA (US); Raghvendra G. Savoor, Walnut Creek, CA (US); James Edward Hoffmann, Indianapolis, IN (US); Jerold Daizo Osato, Pinole, CA (US); David Berendsen, Glendale, WI (US); Richard E. Hawthorne, New Berlin, WI (US); Randal D. Biederstedt, Indianapolis, IN (US); David W. Curry, Indianapolis, IN (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1161 days.

(21) Appl. No.: 10/901,922

(22) Filed: Jul. 29, 2004

(65) Prior Publication Data

US 2006/0023860 A1   Feb. 2, 2006

(51) Int. Cl.
*H04M 7/00* (2006.01)
(52) U.S. Cl. .............................. 379/221.01; 379/220.01
(58) Field of Classification Search ............ 379/221.01, 379/220.01; 703/1
See application file for complete search history.

(56) References Cited

U.S. PATENT DOCUMENTS

| 5,546,542 A | 8/1996 | Cosares et al. |
|---|---|---|
| 5,627,971 A | 5/1997 | Miernik |
| 5,761,432 A | 6/1998 | Bergholm et al. |
| 5,923,646 A | 7/1999 | Mandhyan |
| 5,974,127 A | 10/1999 | Wernli et al. |
| 6,061,335 A | 5/2000 | De Vito et al. |
| 6,233,313 B1 | 5/2001 | Farris et al. |
| 6,327,350 B1 | 12/2001 | Spangler et al. |
| 6,668,241 B2 | 12/2003 | Chen et al. |
| 6,678,355 B2 | 1/2004 | Eringis et al. |
| 6,718,023 B1 | 4/2004 | Zolotov |
| 6,850,611 B1 * | 2/2005 | Chalk ..................... 379/221.01 |
| 6,892,169 B1 * | 5/2005 | Campbell et al. .............. 703/1 |
| 2001/0033570 A1 | 10/2001 | Makam et al. |

* cited by examiner

*Primary Examiner*—Ahmad F Matar
*Assistant Examiner*—Sonia Gay
(74) *Attorney, Agent, or Firm*—Toler Law Group

(57) ABSTRACT

A method of detecting misrouted inter-office transport facility routes in a telecommunications system is disclosed. The method includes receiving a plurality of provisioning orders corresponding to a plurality of newly requested inter-office facility routes to be added to the telecommunications system, and comparing the plurality of newly requested inter-office facility routes to a plurality of preferred routes that have been stored in a preferred routes database to identify a first set of routes that match the preferred routes, a second set of misrouted routes where a preferred route has been defined and previously stored, but where the newly requested route does not match the preferred route, and a third set of unmatched routes where a preferred route has not been previously stored in the preferred routes database.

21 Claims, 8 Drawing Sheets

METHOD OF DETECTING MISROUTED INTER-OFFICE TRANSPORT FACILITY ROUTES IN A TELECOMMUNICATIONS SYSTEM

FIELD OF THE DISCLOSURE

The present disclosure is generally related to a method of detecting misrouted inter-office transport facility routes in a telecommunications system.

BACKGROUND

Telecommunication service providers build thousands of inter-office facility circuits every week. There are no clear quantitative and objective criteria on defining, guiding, and validating facility level routing within the traditional local exchange server ILEC network management support systems, such as the trunks integrated record keeping system (TIRKS). As a result, the process of managing this routing is an ad-hoc manual approach.

Assume a Local Access Transport Area (LATA) with 50 wire centers (offices). If a cross section is defined as the pair of wire centers where a customer's circuit enters and exits the interoffice network, then there are 1,225 A-Z "cross sections" within the LATA ($[N \times (N-1)]/2$). For each unique A-Z cross section, there are typically many different ways that circuits between these two points can be routed within the network. Some of these routes make efficient use of the network facilities, and many of them don't.

Transport planners are continually adding new capacity into the network as the existing capacity is used to meet customer demand. As new capacity is added, some of it will be added in such a manner that creates new alternatives for routing future customer demand. As a result, what used to be the most efficient way to route traffic in certain cross sections will become inefficient due to subsequently deployed technology and/or routes. Absent a comprehensive preferred route reference, it is impossible for the Provisioning group to take the time to ensure that every circuit is designed using the most efficient route. In addition, absent a comprehensive preferred route reference, it is very difficult to programmatically audit the new circuits to be provisioned to determine if they have been efficiently designed. The result is that many circuits are designed and provisioned that are more complex than they need to be. This added complexity produces a number of negative consequences. (1) They take Operations longer to turn up, reducing their productivity (2) they have more potential points of failure, decreasing MTTF (3) they are more difficult to troubleshoot, extending MTTR and (4) they consume more facilities than are required, necessitating deployment of more facilities than required, increasing unit costs.

Accordingly, an improved method for documenting preferred routing within the network, and the ability to detect new circuit designs that do not follow preferred routing is needed.

BRIEF DESCRIPTION OF THE DRAWINGS

FIGS. 3-8 illustrate web-based views and user interfaces.

The use of the same reference symbols in different drawings indicates similar or identical items.

DETAILED DESCRIPTION OF THE DRAWINGS

Embodiments of the present disclosure relate to a method of detecting misrouted inter-office transport facility routes in a telecommunications system. The method includes receiving a plurality of provisioning orders corresponding to a plurality of newly requested inter-office facility routes to be added to the telecommunications system, and comparing the plurality of newly requested inter-office facility routes to a plurality of preferred routes that have been stored in a preferred routes database to identify a first set of routes that match the preferred routes, a second set of misrouted routes where a preferred route request has been defined and previously stored, but where the newly requested route does not match the preferred route, and a third set of unmatched routes where a preferred route has not been previously stored in the preferred routes database.

Embodiments of the present disclosure also relate to a system for use in detecting misrouted inter-office transport facility routes in a telecommunications system. The system comprises a provisioning order module configured to receive a plurality of provisioning orders corresponding to a plurality of newly requested inter-office facility routes to be added to the telecommunications system, a preferred routes database to store a plurality of preferred inter-office transport facility routes within the telecommunications system, and a matching engine to compare the plurality of newly requested inter-office facility routes to the plurality of preferred routes that have been stored in the preferred routes database to identify a first set of matching routes, a second set of mismatched routes where a preferred route has been defined and previously stored, but where the newly requested provisioned route does not match the preferred route, and a third set of unmatched routes where a preferred route has not been previously stored in the preferred routes database.

Figure 1:
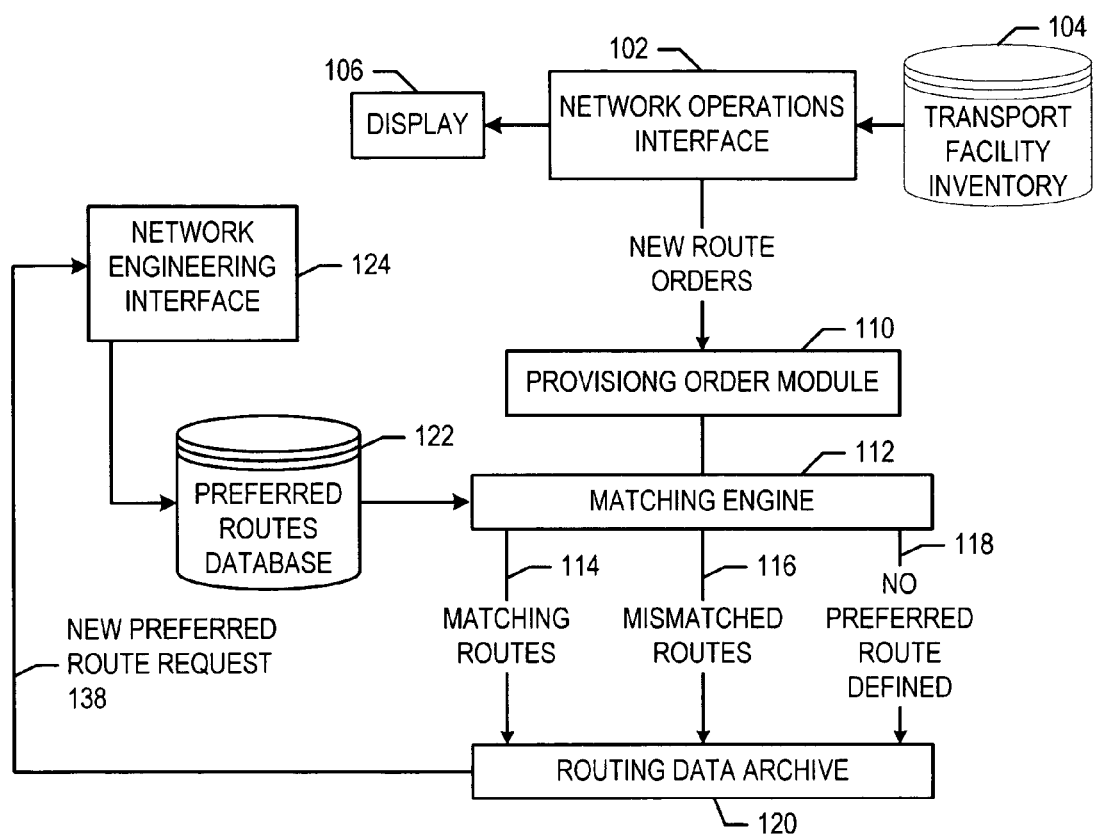
FIG. 1 is a block diagram of an illustrative system of provisioning routes.

Referring to FIG. 1, an illustrative system is shown. The system includes a network operations interface 102, a provisioning order module 110, matching engine 112, and routing data archive 120. The system also includes a preferred routes database 122 and a network engineering interface 124. The network operations interface 102 is responsive to data from a transport facility inventory 104 and is coupled to a terminal display 106. The network operations interface 102 receives the transport facility inventory information and allows network operations personnel to create new route orders 108, that are provided to the provisioning order module 110. The provisioning order module 110 creates new orders for prospective routes, such as new links within a SONET optical network to be provisioned.

The prospective provisioned orders are fed to the matching engine 112 where the provisioned orders are compared to the preferred routes database information from preferred routes database 122. The matching engine 112 compares each of the prospective provisioned orders to the preferred routes database to identify whether each of the provisioned orders constitute a preferred route. The matching engine 112 then creates various classifications of the provisioned routes, such as a first set of routes that match the preferred routes database 122, referred to as "matching routes" 114, a second set of routes that do not match the database referred to as "mismatched routes" 116, and a third set of routes where no entry is found within the preferred routes database 122 labeled "no preferred route defined" 118. The first, second, and third sets of routes are then stored within the routing data archive 120. For routes created by the provisioning order module 110 where no route is defined within the preferred routes database (i.e., the third set of routes 118), such routes are fed as an input to the network engineering interface 124, as illustrated by the request for new preferred route request 138. Where no preferred route has yet been defined within the database, a new preferred route request 138 is forwarded to the network engineering interface 124. The network engineering interface 124 allows network engineers to define new preferred routes to supplement and enhance the routes within the preferred routes database 122. An example of a preferred route is determined based on least cost routing and includes a plurality of data entries, such as a transport element, a facility, a location, an origination, and a destination point. A computer data model may be used to construct and store routes. Feedback from the provisioning process is fed through a routing archive into a network engineering function to allow for updated and enhanced preferred routes, which are then used in evaluating future provisioning orders.

Figure 2:
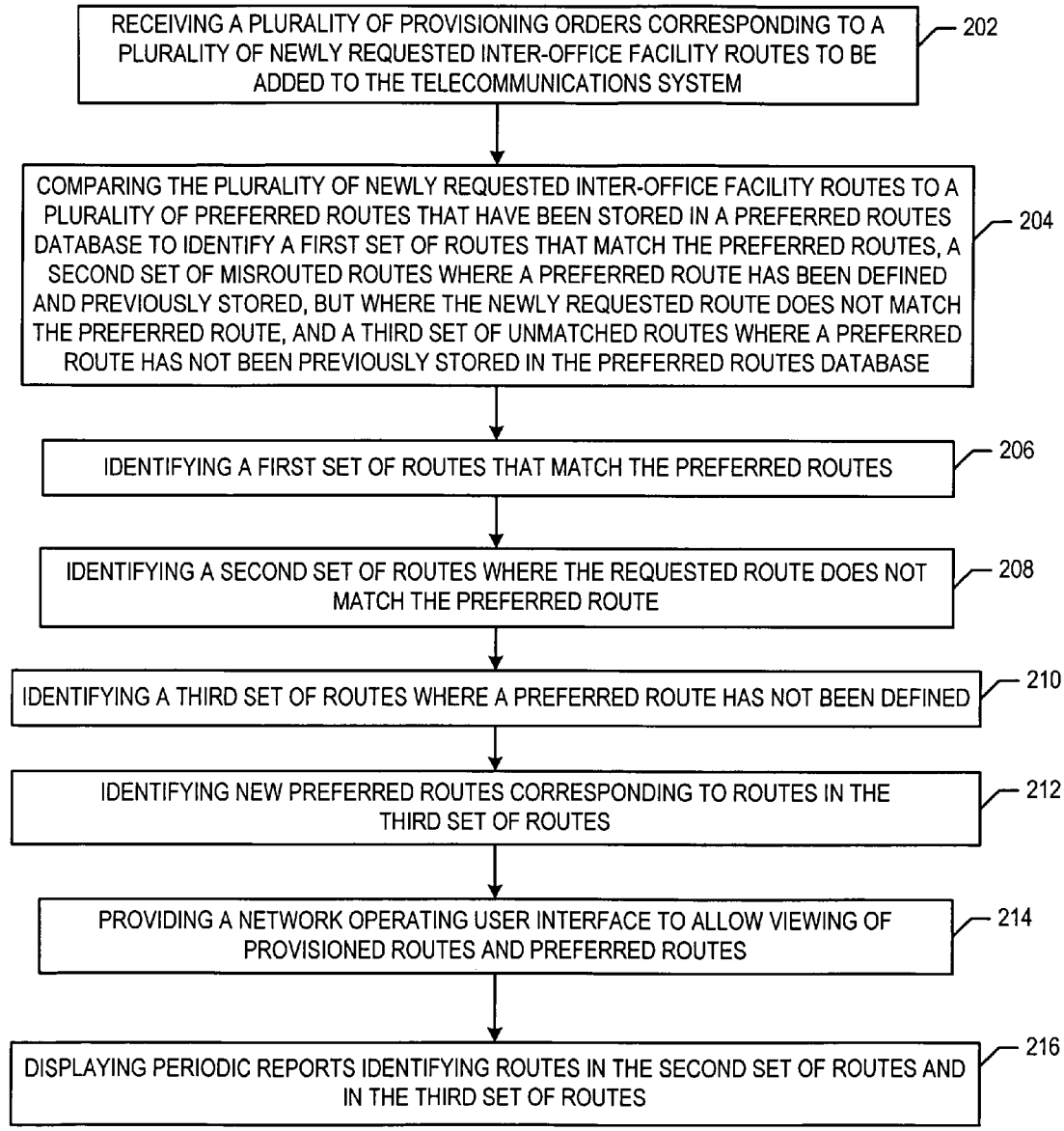
FIG. 2 is a flow chart of a method of operation of the system of FIG. 1.

Referring to FIG. 2, a method of operation is shown with respect to the system illustrated in FIG. 1. A plurality of provisioning order requests are received, as shown at step 202. The plurality of prospective provisioning orders are compared to a preferred routes database, as shown at step 204. Based on the comparison between the preferred routes database information and the prospective provisioning orders, a first set of routes that match the preferred routes is identified, as shown at 206. At step 208, a second set of routes is identified where the second set of routes includes requested routes that do not match the preferred routes in the database. A third set of routes are identified where a preferred route from the preferred routes database has not been defined, as shown at step 210. A new preferred route corresponding to the previously undefined routes in the third set of routes is then identified and created, as shown at step 212. An example of a method to create such new routes is by using a network engineering interface as shown with respect to FIG. 1. A network operations user interface is provided to allow viewing of the provisioned routes as well as the preferred routes, as shown at 214. An example of a display to allow viewing of provisioned and preferred routes is shown as display 106 tied to the network operations interface 102, as shown in FIG. 1. Periodic reports may be displayed or printed to identify routes within the second set of routes and in the third set of routes, as shown at step 216. The second and third sets of routes are routes that are either not preferred routes, namely mismatched routes, or undefined routes not found in the preferred routes database. These routes require operator attention to construct new routes or to redeploy routes that have been mismatched to use the preferred routes. In this manner, an automated system and method may be implemented to enhance efficiency of provisioned routes for use within an optical network, such as a SONET network. In addition, a preferred routes database may be initially constructed and updated to provide enhanced information in response to receiving feedback from mismatched and undefined routes in connection with the real-time provisioning order process.

The disclosed system provides an automated system of a previously manual ad-hoc function to provide improved quality of network routing and reduced network and operating expenses. A particular embodiment of the preferred routing database may be constructed for interoffice facility transport routes, such as SONET network optical routes. In addition, synchronized data collection and pattern matching invalidation techniques may be deployed with respect to provisioned circuits, as compared to the preferred routes database. For misroutes and unspecified routes, a root cause analysis may be performed by evaluating data within a second and third set of routes stored within a route archive. This feature allows for improved routing decisions.

The display and reporting information may be provided by a user-friendly web based navigation and mediation feature tied to a distributed computer network. Such an interface may be used by engineering and operational personnel charged with network management. In addition, daily, weekly, and monthly reporting, searching, and auditing capability is enhanced through use of the disclosed system and method.

Figure 3:
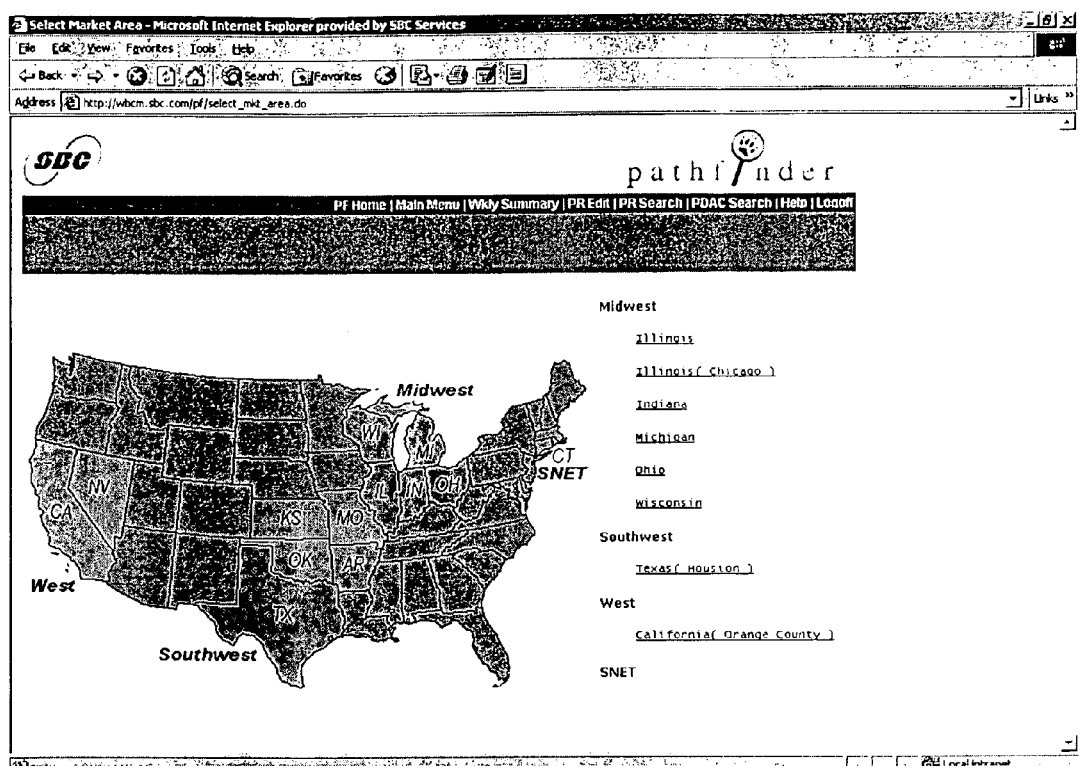

Referring to FIG. 3, a display suitable for use as a network operations interface is shown. The display is a geographical display to identify a high-level view of network coverage.

Figure 4:
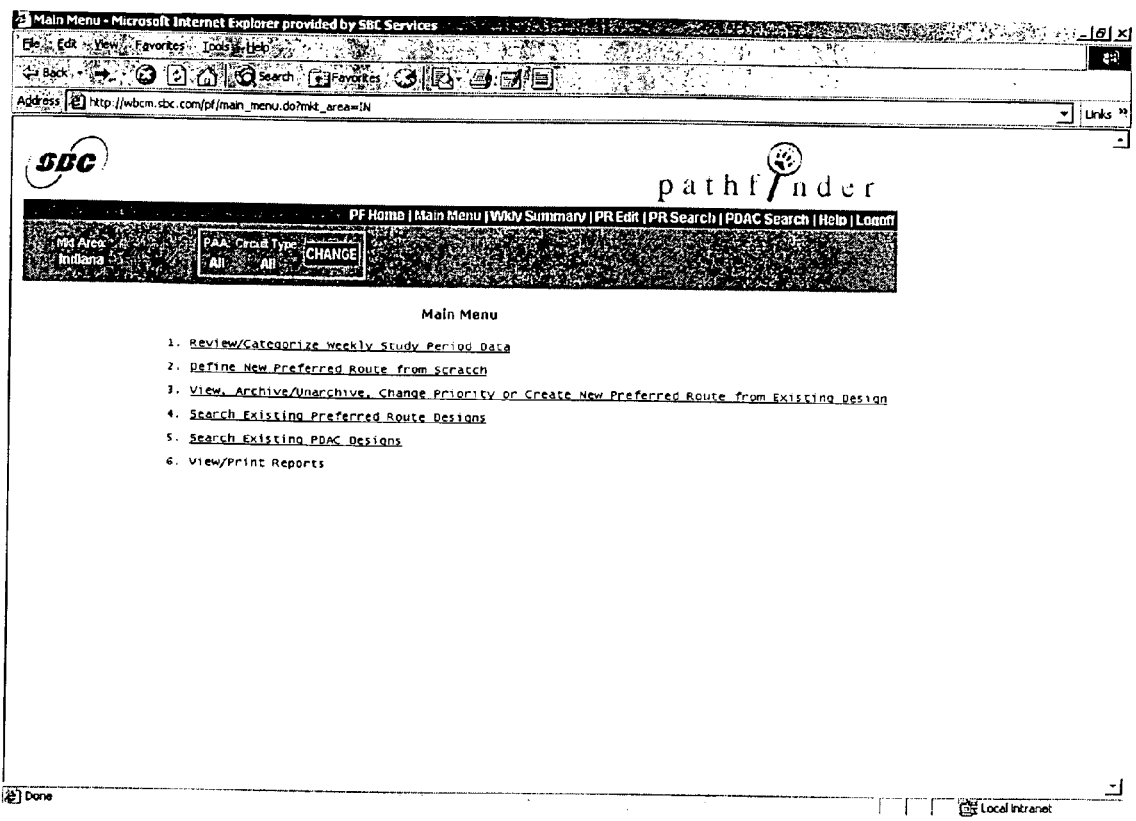

Referring to FIG. 4, a sample view of a user interface for the network operations interface is shown. The display illustrates various actions that may be taken, such as to review or categorize weekly study data, to define new preferred routes, to view the archive or to unarchive, to change priority of preferred routes, to search existing preferred route designs, and to search existing Inter-Office Facility (IOF) designs as possible new preferred route designs. In addition, various reports may be printed for further analysis by either network operations or network engineering personnel.

Figure 5:
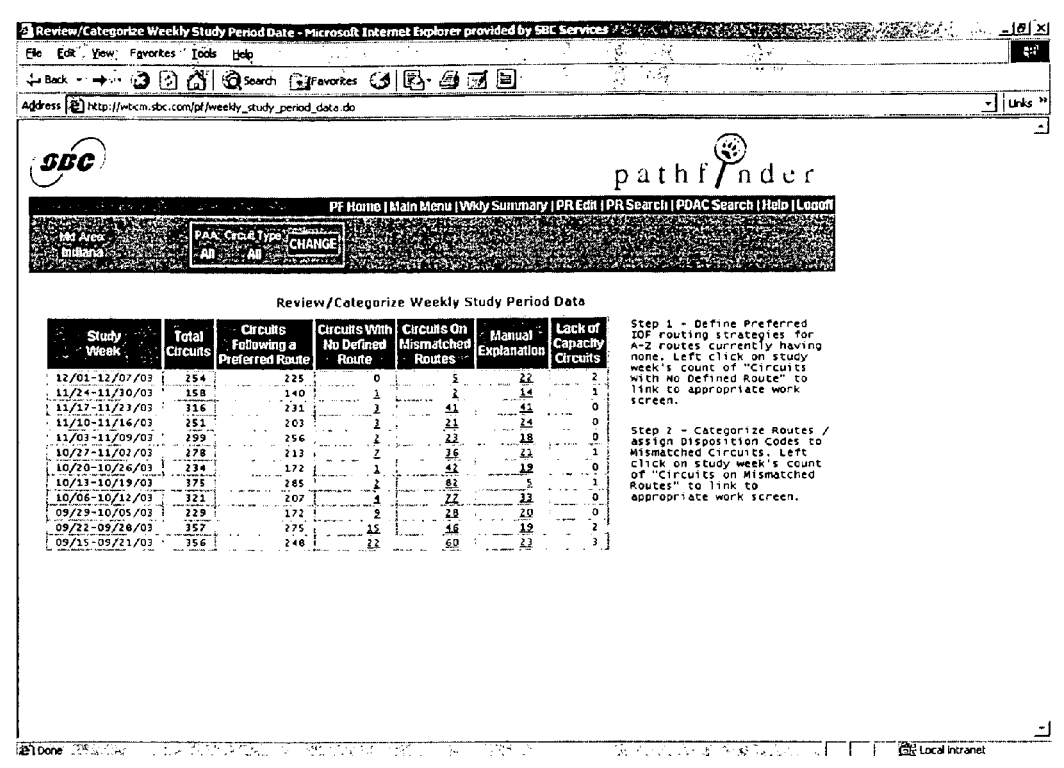

Referring to FIG. 5, a summary report is shown. The summary report illustrates defined preferred interoffice facility routing strategies for various routes for use by telephony offices. The summary report identifies circuit totals, including data such as the number of circuits following preferred routes and the number of mismatched routes, as well as indications for explanations of the mismatched routes.

Figure 6:
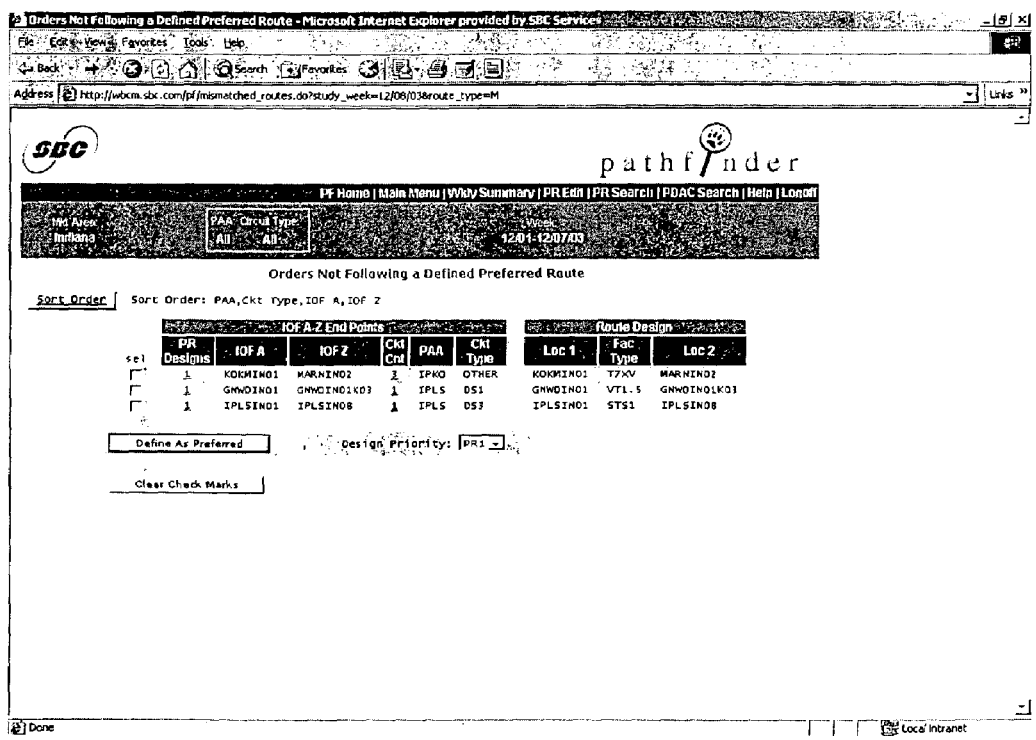

Referring to FIG. 6, a summary report of particular interoffice facility endpoints and related data for use by network engineering and operations personnel is illustrated.

Figure 7:
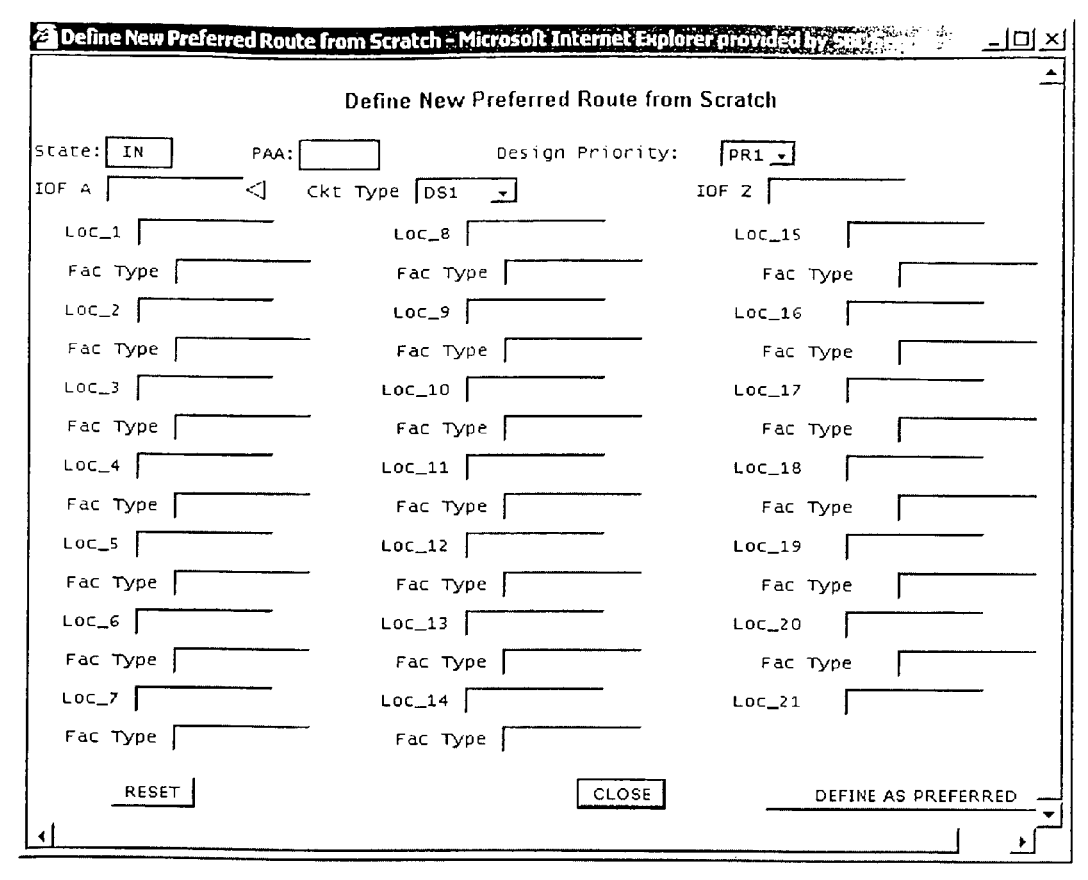

Referring to FIG. 7, a user interface for inputting facility data and location information for use in network management is shown. The facility and location information is used to construct new preferred routes when defining the preferred routes database and for enhanced routing management.

Figure 8:
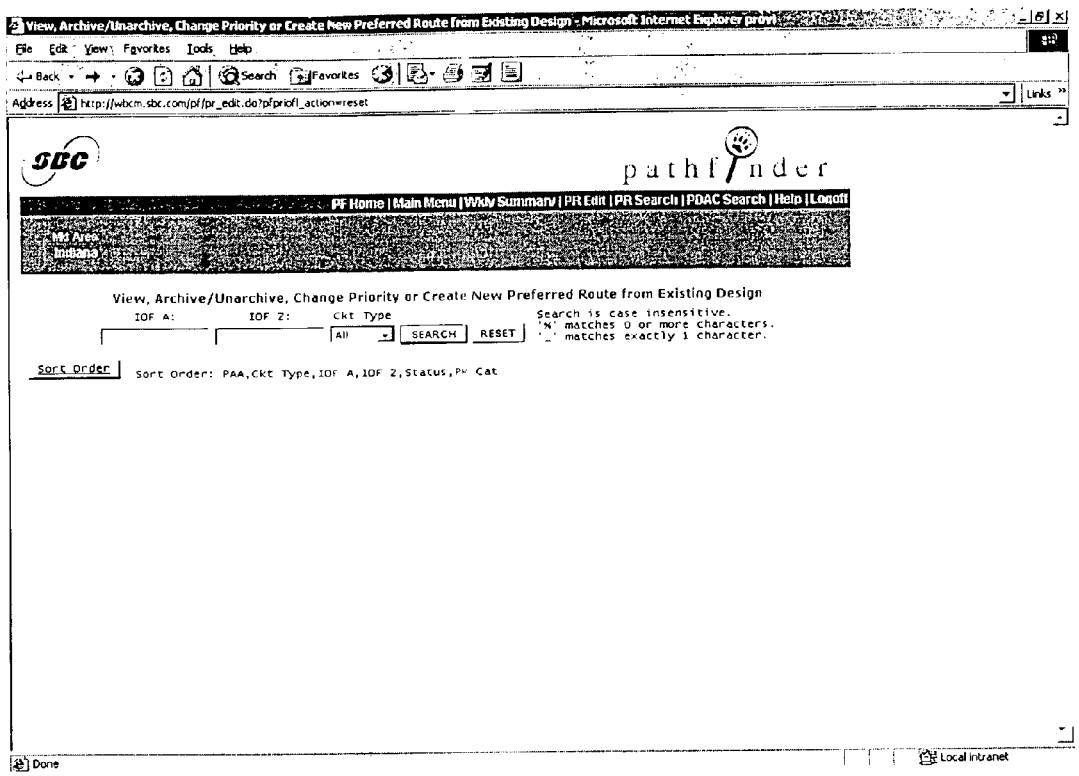

FIG. 8 illustrates a user interface view where engineers or network operations personnel may view, store, retrieve, change priority, or create new preferred routes for the system and method illustrated.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of detecting misrouted inter-office transport facility routes in a telecommunications system, the method comprising:

receiving, at a network planning system, a plurality of provisioning orders corresponding to provisioned routes of a plurality of newly requested inter-office facility routes to be added to the telecommunications system;

comparing, at the network planning system, the plurality of newly requested inter-office facility routes to a plurality of preferred routes that have been stored in a preferred routes database to identify a first set of routes that match the preferred routes, a second set of misrouted routes where a preferred route has been defined and previously stored, but where the newly requested route does not match the preferred route, and a third set of unmatched routes where a preferred route has not been previously stored in the preferred routes database; and providing a network operations user interface to a display device to allow viewing of provisioned routes and preferred routes.

2. The method of claim 1, further comprising identifying new preferred routes corresponding to each of the routes in the third set of unmatched routes and adding the new preferred routes to the preferred routes database.

3. The method of claim 1, further comprising:
providing a network engineering user interface to the display device to allow creation of a new preferred route in response to detection of at least one route in the third set of unmatched routes; and
saving the new preferred route in the preferred routes database.

4. The method of claim 1, wherein the plurality of preferred routes are identified based on least cost routing.

5. The method of claim 1, wherein the plurality of preferred routes correspond to a data model including a plurality of data entries, each of the data entries identifying a transport element, a facility, a location, an origination point and a destination point of the route.

6. The method of claim 1, wherein the plurality of newly requested inter-office facility routes are retrieved from a circuit inventory database.

7. The method of claim 6, wherein the plurality of newly requested inter-office facility routes are retrieved from a circuit inventory database on a periodic and time synchronous basis.

8. The method of claim 1, wherein the network engineering user interface and the network operations user interface are web based interfaces.

9. The method of claim 1, further comprising displaying periodic reports of each of the second set of mismatched routes and the third set of unmatched routes at the display device.

10. The method of claim 9, further comprising storing the first set of matched routes, the second set of mismatched routes, and the third set of unmatched routes to provide for searching and data audits of such route data.

11. The method of claim 1, wherein the inter-office transport facility route defines traffic that is to be communicated using a SONET ring.

12. A network planning system for use in detecting misrouted inter-office transport facility routes in a telecommunications system, the system comprising:
a provisioning order module of a computer to receive a plurality of provisioning orders corresponding to a plurality of newly requested inter-office facility routes to be added to the telecommunications system;
a preferred routes database of the computer to store a plurality of preferred inter-office transport facility routes within the telecommunications system;
a matching engine of the computer to compare the plurality of newly requested inter-office facility routes to the plurality of preferred routes that have been stored in the preferred routes database to identify a first set of matching routes, a second set of mismatched routes where a preferred route has been defined and previously stored, but where the newly requested provisioned route does not match the preferred route, and a third set of unmatched routes where a preferred route has not been previously stored in the preferred routes database; and
a network operations user interface having access to the preferred routes database to allow viewing of provisioned routes and preferred routes on the display device.

13. The network planning system of claim 12, further comprising a network engineering user interface to allow creation of preferred routes in response to detection of at least one route in the third set of unmatched routes, wherein the network engineering user interface allows a user to select an IOF Design from a complete list of existing IOF Designs based on existing circuits currently provisioned in the telecommunications system as a new preferred route, and wherein the new preferred route is modifiable to better suit user costing and engineering requirements.

14. The network planning system of claim 12, wherein the plurality of preferred routes are identified based on least cost routing.

15. The network planning system of claim 12, further comprising a computer stored and readable data model including a plurality of data entries, each of the data entries identifying a transport element, a facility, a location, an origination point and a destination point of the route, wherein the plurality of preferred routes correspond to the data model.

16. The network planning system of claim 12, further comprising a computer stored and readable inventory database that stores the plurality of newly requested inter-office facility routes and wherein the provisioning order module has access to the inventory database.

17. The network planning system of claim 12, wherein the display device is responsive to the network operations user interface to display periodic reports of each of the second set of mismatched routes and the third set of unmatched routes.

18. The network planning system of claim 12, further comprising a computer stored and readable routing data archive to store the first set of matched routes, the second set of mismatched routes, and the third set of unmatched routes to provide for searching and data audits of the routing data.

19. The network planning system of claim 12, wherein the inter-office transport facility route defines traffic that is to be communicated using a SONET ring.

20. A method of detecting misrouted inter-office transport facility routes in a telecommunications system, the method comprising:
receiving, at a network planning system, a plurality of provisioning orders corresponding to a plurality of newly requested inter-office facility routes to be added to the telecommunications system;
comparing, at the network planning system, the plurality of newly requested inter-office facility routes to a plurality of preferred routes that have been stored in a preferred routes database to identify a first set of routes that match the preferred routes, a second set of misrouted routes where a preferred route has been defined and previously stored, but where the newly requested route does not match the preferred route, and a third set of unmatched routes where a preferred route has not been previously stored in the preferred routes database;
identifying, at the network planning system, new preferred routes corresponding to each of the routes in the third set of unmatched routes and adding these new preferred routes to the preferred routes database;
providing a network engineering user interface to a display device to allow creation of new preferred routes in response to detection of the third set of unmatched routes; and
providing a network operations user interface to a display device to allow viewing of provisioned routes and preferred routes.

21. The method of claim 20, wherein the plurality of preferred routes are identified based on least cost routing.

* * * * *